United States Patent [19]
Anderson et al.

[11] 3,802,786
[45] Apr. 9, 1974

[54] DEAD VOLUME COMPENSATION IN CONCENTRATION DIFFERENCE CELL

[75] Inventors: David W. Anderson, Fargo, N. Dak.; Rufus W. Lumry, Minneapolis, Minn.; Kenyon P. George, Arcadia, Calif.

[73] Assignee: Varian Associates, Palo Alto, Calif.

[22] Filed: Dec. 20, 1972

[21] Appl. No.: 316,707

[52] U.S. Cl. ............................ 356/246, 250/218
[51] Int. Cl. ....................... G01n 1/10, G01n 21/24
[58] Field of Search .................... 356/246; 250/218

[56] References Cited
UNITED STATES PATENTS
3,707,331  12/1972  George et al. ................. 356/246

*Primary Examiner*—Ronald L. Wibert
*Assistant Examiner*—V. P. McGraw
*Attorney, Agent, or Firm*—William W. Haefliger

[57] ABSTRACT

A concentration difference cell assembly adapted for use with spectrophotometer apparatus producing a light beam. The cell assembly comprises:

a. structure defining first and second chambers including windows located to pass the beam transmitted successively through the chambers, b. the chambers having associated beam path dimensions, the beam path dimension of the first chamber adapted to increase while the beam path dimension of the second chamber decreases and in response to movement of at least one window, whereby the volume of the first chamber remains proportional to the increase in the beam path dimension of the first chamber, and the sum of the beam path dimensions of the first and second chambers remains constant, c. the chambers arranged in such relation that a predetermined quantity of a first liquid may be introduced into the first chamber for mixing with auxiliary liquid therein accompanied by movement of said one window toward the second chamber containing second liquid, d. structure defining a mixing chamber communicating with the beam passing first chamber to receive liquid therefrom and to return said liquid thereto, and e. there being a passage which retains a remanent portion of the liquid outside the first chamber when the mixing chamber has minimum volume, and the volume of the first chamber outside the beam path is diminished endwise of the first chamber by an amount equal to the volume of that remanent portion to compensate therefor.

18 Claims, 7 Drawing Figures

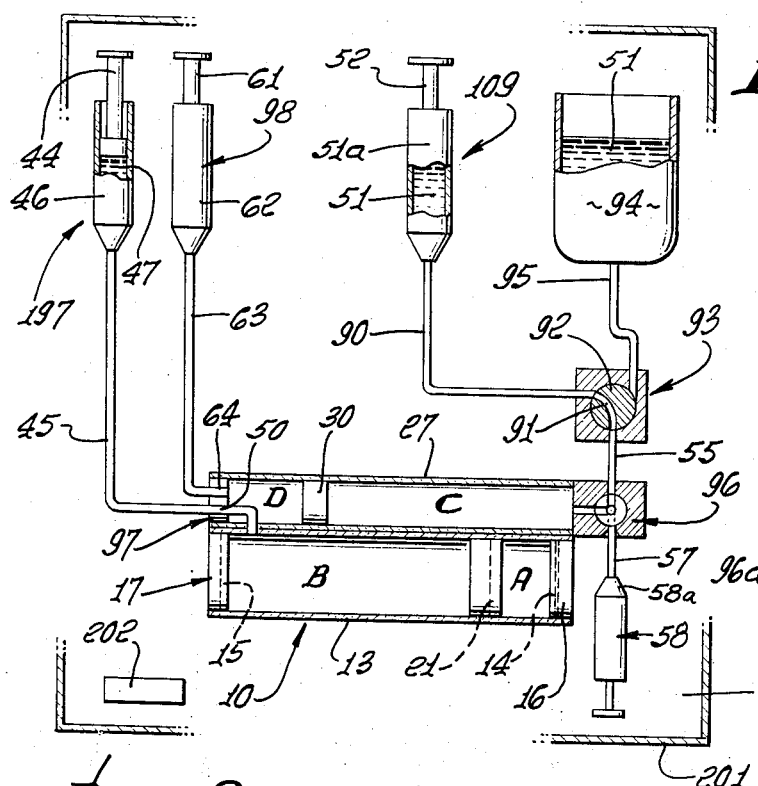
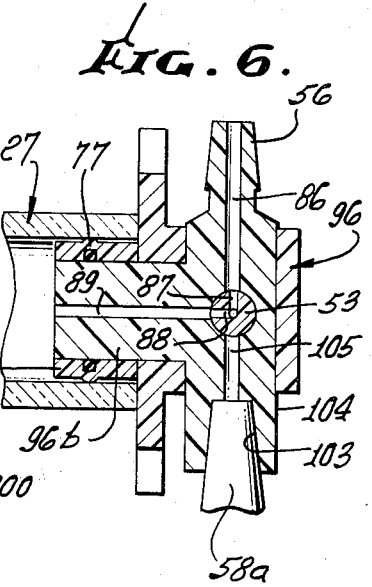
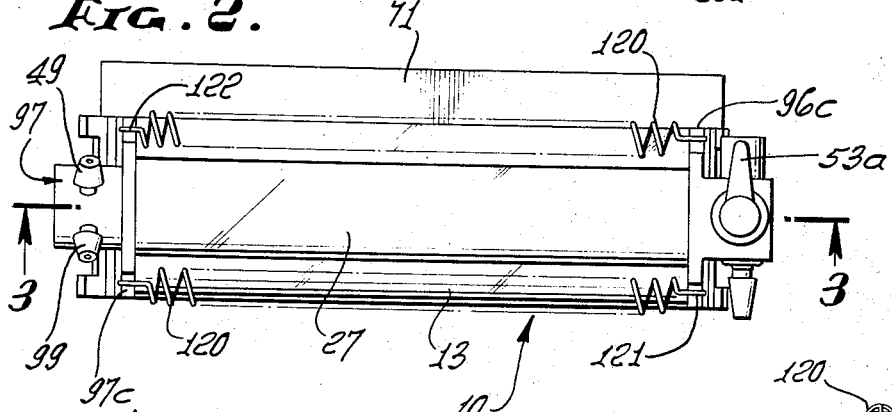
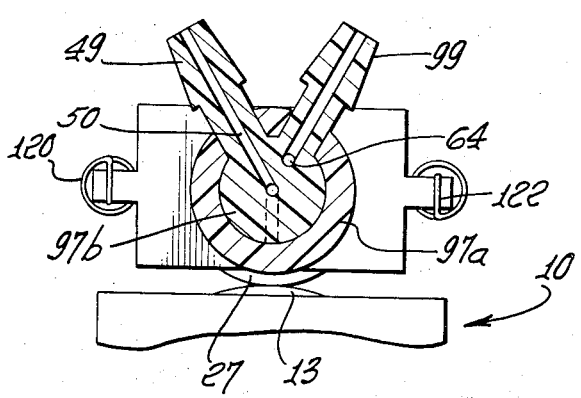
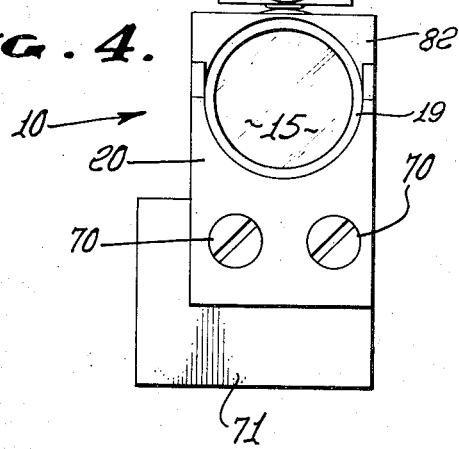

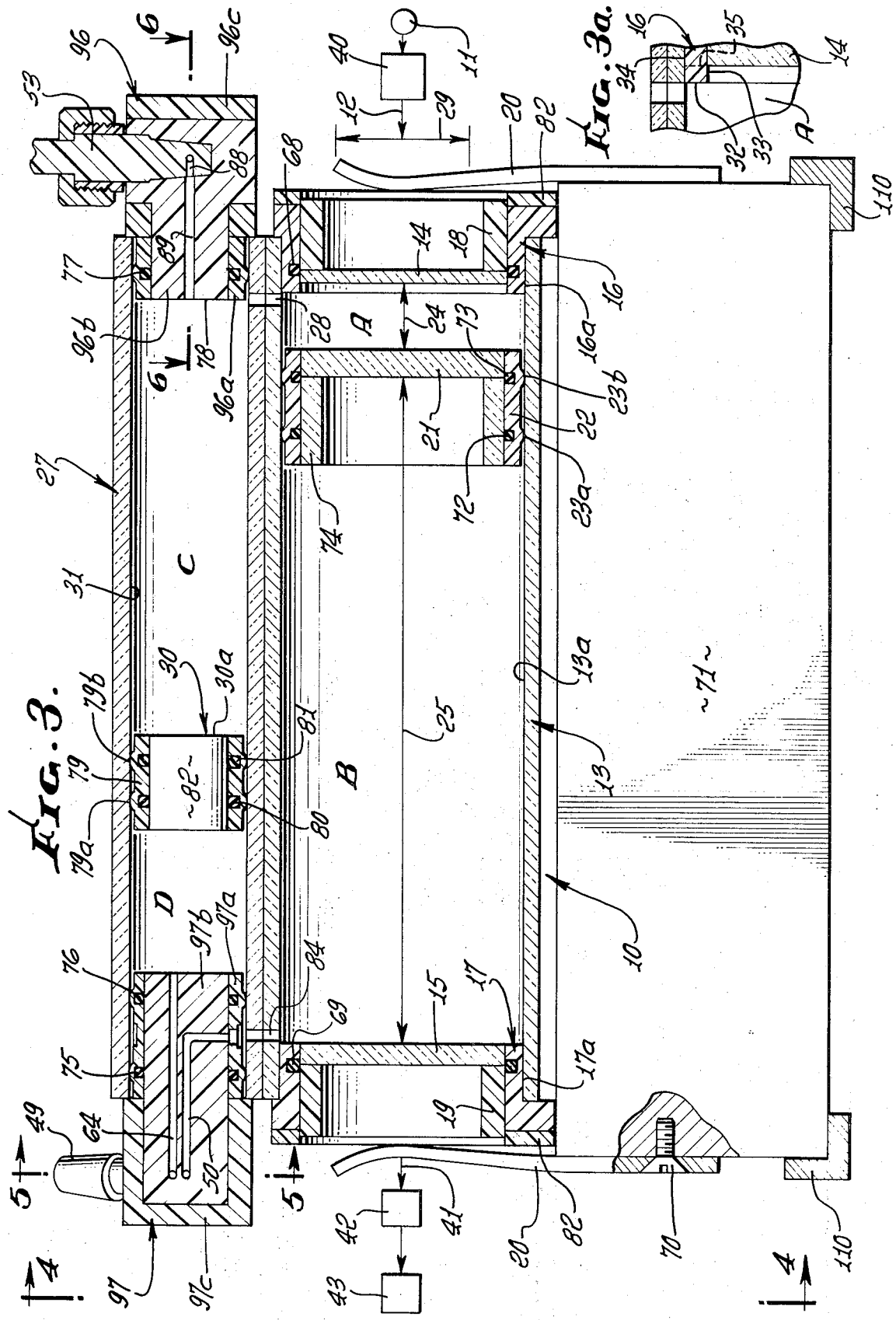

DEAD VOLUME COMPENSATION IN CONCENTRATION DIFFERENCE CELL

BACKGROUND OF THE INVENTION

This invention relates generally to optical absorption, and more particularly concerns apparatus usable to measure the effect on optical absorption of changes in the concentration of a liquid sample.

Optical absorption measurement techniques normally involve passing electromagnetic radiation through an absorption cell containing liquid consisting of a sample and a solvent. The sample is typically a solution of one or more light absorbing substances in a suitable tranparent solvent. It is in certain instances desired to measure the effect on optical absorption of a change in the concentration of the sample. Such measurements can be made most sensitively if the change in concentration is exactly compensated by an equal and opposite change in optical path length, without changing other parameters such as refractive index, optical beam geometry, or cell window geometry. The Lambert-Beer equation states:

$$T = 10^{(-abc)} \quad (1)$$

or $$A = abc \quad (2)$$

where:

$T$ is the optical transmittance,
$A$ is the optical absorbance,
$a$ is the absorptivity of the substance in the absorption cell,
$b$ is the optical path length in the absorption cell, and
$c$ is the sample concentration.

From equation 2 it appears that if $b$ is varied inversely when $c$ is changed, any shift in $A$ reflects a change in absorptivity due to dissociation or association, or solvent-solute interaction. While these effects are small, they do reveal important information about the nature of solvation, binding and the intimate environment of the chromophore groups of the absorbing molecules.

A known concentration difference cell of unusually advantageous construction employs first and second chambers including windows located to pass a light beam produced by spectrophotometer apparatus, so that the beam passes successively through the chambers. In that cell, the beam path dimension of the first chamber is adapted to increase while the beam path dimension of the second chamber decreases and in response to movement of a third beam passing window, whereby the volume of the first chamber remains proportional to the increase in the beam path dimension of the first chamber, and the sum of the beam path dimensions of the two chambers remains constant. Further, the arrangement of the chambers is characterized in that a predetermined volume of a first liquid (for example solvent) may be introduced into the first chamber for mixing with a quantity of sample or auxiliary liquid, the third window moving toward the second chamber during such introduction.

In order for the above cell to meet the conditions necessary for concentration difference spectroscopy, not only should the sample be caused to thoroughly mix with the first liquid, but also all volumes of the sample before and after mixing with the first liquid must contribute to the total pathlength of the light through the liquid. It is found, however, that in practice, a small volume of sample always lies outside the first chamber in a device relying upon withdrawal of liquid from the first chamber for external thorough mixing. This condition made it impossible to meet the above requirement, and no way was known, to our knowledge, to overcome this problem.

SUMMARY OF THE INVENTION

It is a major object of the invention to provide apparatus characterized in its construction and operation as overcoming the above problem, and also providing additional unusual advantages in structure, mode of operation and results.

Basically, the invention is embodied in the use of structure defining a mixing chamber communicating with the first chamber as referred to, to receive liquid from that chamber and to return liquid to same, and a passage to receive a remanent portion of such liquid outside the first chamber when the mixing chamber has minimum volume, the volume of the first chamber outside the beam path being endwise diminished by an amount equal to the volume of the remanent liquid portion, as for example the volume of the referenced passage. More specifically, and as will be seen, a cap carrying the beam entrance window may project toward the interior of the first chamber relative to the beam entrance window and to an extent defining the above referenced volumetric amount.

Accordingly, any small volume of liquid not contributing to sample path length is simply replaced in the accurately dimensioned chamber A by a solid annulus of equal volume. Also, this construction enables measurements with initial solution pathlengths as short as one or two tenths of a millimeter, greatly increasing the ratio between maximum and minimum pathlengths.

Additional advantages and objects include the provision of main and mixing barrels containing plungers that may be simply and controllably operated, as for example hydraulically, to achieve externally controlled mixing, and bubble elimination; and provision for injection of sample liquid into the mixing barrel.

These and other objects of the invention, as well as the details of an illustrative embodiment, will be more fully understood from the following description and drawings.

DRAWING DESCRIPTION

FIG. 1 is a side elevation taken in section to schematically show one form of the cell;

FIG. 2 is a top plan view of the cell showing details of construction;

FIG. 3 is an enlarged sectional elevation taken on lines 3—3 of FIG. 2;

FIG. 3a is an enlarged fragmentary sectional portion of FIG. 3;

FIG. 4 is a reduced end elevation taken on lines 4—4 of FIG. 3;

FIG. 5 is fragmentary sectional elevation taken on lines 5—5 of FIG. 3; and

FIG. 6 is a fragmentary horizontal section taken on lines 6—6 of FIG. 3.

DETAILED DESCRIPTION

Referring first to FIGS. 1 and 3, the illustrated concentration difference cell assembly 10 comprises first and second chambers including windows to pass a light beam 12 from source 11 for transmission successively through the chambers. Such chambers may be as indicated by the letters A and B, and formed by first tubular body or barrel 13 and windows 14 and 15 attached to opposite ends of the body. For this purpose, window carrying plastic (as for example tetrafluoroethylene) caps or holders 16 and 17 may be fitted at 16a and 17a into end portions of the barrel, and the holders may carry window tubular supports 18 and 19. Suitable O-rings 68 and 69 seal off between the holders, windows and supports, as shown. The supports may be held in assembled relation by bifurcated spring members 20 releasably retained by fasteners 70 to base 71, and pressing against end plates 82. Removal of the spring members allows removal of the caps, for cleaning.

A third window 21 is confined within the body 13 and is mounted on a tubular part or sleeve 22 of an outside diameter slidably fitting the bore 13a of the body 13, so that the sleeve can be easily moved along that bore. Typically, the body 13 may consist of glass, and the sleeve of plastic such as tetrafluoroethylene. Annular bulging seals 23a and 23b may be formed by the sleeve to engage bore 13a and seal against liquid leakage between the chambers A and B. A buffer zone is created between the two seals for optimum protection against such leakage. Elastomer O-rings 72 and 73 seal off between the sleeve bore and the window 21 and a holder 74 therefor, as shown. In addition, the O-rings 68, 69, 72 and 73 exert radial pressure to produce the annular bulging typified by 23a and 23b.

The two chambers A and B have beam path dimensions 24 and 25, as shown, the path dimension 24 of the first chamber A being adapted to increase at the same time that the path dimension 25 of the second chamber B decreases (in response to leftward sliding of the piston or sleeve 22, for example). Note that the volume of the first chamber A remains proportional to the increase in the beam path dimension 24 and that the sum of dimensions 24 and 25 remains constant. In the specific example, the volumes of the chambers A and B are respectively increased and decreased. Further, the chambers are sized so that a predetermined quantity of a first liquid A (as for example solvent) may be introduced into the first chamber for mixing with a quantity of auxiliary or sample liquid, such introduction being accompanied by movement of window 21 to the left. The first liquid or solvent may for example consist of the same liquid as is in the second chamber.

In accordance with an important feature of the invention, structure is provided to define a mixing chamber, as for example chamber C communicating with chamber A to receive liquid therefrom and to return liquid thereto. Such structure may for example include a tubular body or barrel 27, which may consist of glass, extending adjacent barrel 13 and with end portions capped as by holders or end caps 96 and 97. The latter includes sleeves 96a and 97a fitting the barrel bore, plugs 96b and 97b received in the sleeves, and outer covers 96c and 97c O-rings 75, 76 and 77 seal off between the plugs and sleeves, as shown, and exert radial pressure to produce annular bulging, thereby effecting a seal between 96a and 97a and barrel 27.

Further, a passage is provided, as for example at 28 through the adjacently mounted walls of the cylinders 13 and 27. This passage retains a 'dead volume', which is a small but significant remanent portion of the liquid outside first chamber A when the mixing chamber C has minimum volume. The first chamber is constructed so that its volume outside the beam path (see for example the cylindrical beam path diameter 29) is diminished endwise of the first chamber A by an amount equal to the volume of the defined remanent portion of the first liquid outside chamber A. Typically, this condition exists when the mixing chamber C has minimum volume, as for example occurs when a plunger 30 sliding in the bore 31 of barrel 27 occupies its rightward-most position, with plunger end face 30a engaging the end wall 78. The plunger includes a sleeve 79 which, as in the case of sleeve 22, has annularly bulging seals at 79a and 79b to engage bore 31 and seal against leakage between chambers C & D. Elastomer O-rings 80 & 81 seal off between sleeve 79 and body 82, and exert radial pressure to produce annular bulging, as described.

In the example, and as better seen in FIG. 3a, the end wall 32 of cap 16 projects toward or into the interior of the chamber A relative to the window 14 and to an extent defining the referred to amount of diminished volume of the first chamber A. For example, that volumetric amount may be defined by the volume of a cylinder or ring whose inner and outer diameters are indicated at 33 and 34, and whose end walls are indicated by parallel planes 32 and 35. Diameter 34 is coterminous with the bore 13a of tube 13, and plane 35 is coterminous with the inner face of window 14. The reference ring may take the form of a loose washer, whose thickness could be selected or adjusted to achieve correct compensation.

In use, the barrel 13 is placed in the light beam 12 of a spectrophotometer, block 40 indicating associated optics as may for example include a monochromator. Light emanating from the cell at 41 passes to a photodetector 42 the output of which is amplified or otherwise suitably processed, and recorded or indicated at 43. Referring to FIG. 1, control of rightward movement of window 21 may be had by advancement of a plunger 44 of mixing syringe 197 in a syringe barrel or reservoir 46 for fluid 47. A duct 45 leading from the reservoir 46 has connection to end cap 97 as by nipple 49, a port 50 in that end cap communicating between the duct 45 and barrel wall passage 84 leading to chamber B. First or dilution fluid 51 may be introduced to chamber A via the mixing chamber C and passage 28. A metering syringe 109 having a reservoir 51a for such dilution fluid is pressurized as at 52, and a stop cock or valve 53 in end cap 96 controls first fluid communication with chamber C via duct 55 and connection 56 with end cap 96 and ports 86–89 as is seen in FIGS. 3 and 6. Duct 55 communicates with the barrel 51a via duct 91, as in FIG. 1. When duct 91 in stop cock 92 of three-way valve 93 is rotated clockwise 120°, barrel 51a is placed in communication with reservoir 94 for fluid 51, as via line 95, allowing refilling of the barrel 51a.

Sample or auxiliary fluid is supplied via line 57 from syringe 58 (or preferably by connecting syringe 58 to end cap 96 by insertion of its conical tip 58a into recess 103 in adapter 104). When stop cock 53 has been rotated 90° counterclockwise from FIG. 6 position. The sample fluid then enters chamber A via chamber C and passage 28. Finally, control of rightward movement of the mixing plunger 30 may be had by advancing plunger 61 of mixing syringe 98 in a syringe barrel 62 connected with duct 63. The latter communicates with the chamber D (at the left of plunger 30 in barrel 27) via port 64 in end cap 97. Nipple 99 on cap 97 is connectible with the end of duct 63.

In operation, and at the beginning of an experiment, the cell is removed from the spectrophotometer absorption cell holding compartment so that it may be more readily manipulated. All interior passages and chambers including passages 28 and 84 and chambers A, B, C and D, as well as reservoir 94 and syringe barrels 46, 62 and 51a and associated ducts and valves are filled with first fluid (i.e. solvent for example). The cell is then turned and manipulated so as to eliminate all bubbles, this operation being facilitated by the flexibility of ducts or lines 45, 55, 57, 63, 90 and 95. The plungers 44 and 61 of mixing syringes 197 and 98 connected to chambers B and D are then forced downward in order to displace first fluid into those chambers to drive the pistons 22 and 30 to the right, so that the volumes of chambers A and C are reduced to a minimum, minimizing dead volume. At this time, the right wall of plunger 30 engages the left interior wall of cap 96, and the right wall of window 21 extends in or proximate to plane 32. During this operation, the stopcock 53 is maintained in FIG. 6 position, and stopcock 92 in FIG. 1 is turned to communicate between ducts 55 and 95 so that first fluid displaced from chambers A and C can reach the reservoir 94.

At this point there are alternate procedures for introducing the first sample. One preferable procedure, ordinarily to be used when an adequate quantity of sample is available, will now be described. Three-way valve stopcock 53 is rotated counterclockwise 90° in FIG. 6 to connect chamber C to the conical recess 103 in adapter 104, via port 105. The conical nose 58a of sample syringe 58 (filled with a quantity of sample liquid) is fitted into recess 103, as shown in FIG. 6, and the sample is injected into chambers A and C. The stopcock 53 is then rotated to closed position in which port 89 has no communication with either of ports 86 and 105, a suitable stopcock handle 53a being provided as seen in FIG. 2, for this purpose. Thereafter, the mixing syringes 197 and 98 are alternately manipulated to effect flow of solution (injected sample plus remanent first fluid) back and forth between chambers A and C, via passage 28. In this way a small amount of first fluid (or solvent) residual in chambers A and C is mixed with a relatively large amount of sample solution.

Next, stopcock 53 is rotated to intercommunicate passages 89 and 105, in FIG. 6, and the plungers 44 and 61 of the mixing syringes depressed to reduce the volumes of chambers A and C to a minimum, as before. This will cause the now very slightly diluted sample to return to the sample injection syringe 58, after which that syringe is removed so that the slightly diluted sample may be replaced with fresh, undiluted sample. This process is repeated if necessary until the concentration of the residual volume of solution in chambers A and C is substantially that of the original sample.

At this point, a known volume of fresh sample is forced, via syringe 58, into chambers A and C, stopcock or valve 53 is turned to connect passage 89 with passage 86 and duct 55, valve 93 is closed, and syringe 98 operated to force plunger 30 to the right in barrel 27, forcing as much as possible of the sample into chamber A via passage 28. The cell is then placed in its holder (indicated at 110 in FIG. 3) in the spectrophotometer, and an initial measurement of absorbance is made.

Note that if syringes 197, 98 and 109 and valve 93 are in a location external to the absorption cell compartment of the spectrophotometer, and the tubes 45, 55 and 63 are passed through light-tight seals, all dilutions may be made without disturbing the cell or admitting light to the cell compartment.

To make the first dilution, the desired amount of first fluid (i.e. solvent for example) from the reservoir 94 is withdrawn into the calibrated metering syringe 109, after turning the stopcock 92 to intercommunicate ducts 90 and 95. That amount of first fluid is then forced into chamber C by manipulation of syringe 119, after stopcock 92 has been turned to intercommunicate ducts 90 and 55. The valve 93 is then closed and the mixing syringes 197 and 98 operated to force the solution (sample plus first fluid) vigorously back and forth between chambers A and C. After as much as possible of the thoroughly mixed solution has been displaced into chamber A, a second absorption reading is made.

Further volumes of diluting first fluid (i.e. solvent) are subsequently added as the above procedure is repeated until the solution is as dilute as desired, or until the piston 22 has been moved into proximity to window 15.

The refractive index of the liquid in chamber A should be kept substantially equal to that of liquid in chamber B so long as the beam path dimension 24 is an appreciable part of the sum of dimensions 24 and 25. It will be noted that during each of these measurements, windows 14, 15 and 21 have remained in the optical path throughout the measurement. Also, the sum of the beam path dimensions 24 and 25 remains constant.

Merely as illustrative, aggregations of protein subunits in hemoglobin samples may be studied in this manner, to measure dissociation of the hemoglobin molecule. A suitable solvent for such a sample may consist of saline solution. Other fluids may be used for the referred to liquids.

A second procedure for introducing the concentrated sample, of particular utility when the sample is available in only limited quantity, is described as follows: After the apparatus has been flushed with first liquid, the bubbles removed and the excess fluid returned to reservoir 94, stopcock 53 is turned to connect chamber C with the sample introduction syringe 58. A known amount of sample liquid is then metered into chamber C, stopcock 53 is turned to connect chamber C with line 55, and valve 93 is closed. The solution in chamber C is then passed back and forth between chambers C and A, by manipulation of syringes 197 and 98, so as to mix with residual solvent traces, and ending with as much as possible of the mixture in chamber A.

The concentration of this solution can now be determined by measuring its absorption, comparing the result with measurements of the actual initial sample or with an absorbance vs concentration calibration curve for the same material at about the same (initial) concentration, measured in the usual, more conventional manner, with cuvettes of known path length. Alternately, solution concentration can be calculated by calibrating the residual volume of chamber A, and the dead volume, in well known ways, and from the known volume of sample inserted from the sample syringe. The residual volume of chamber A can, for example, be determined to good accuracy by measuring the absorption due to filling chamber A residual volume with a concentrated solution of a strongly absorbing substance to find its path length, then measuring the diameter of the cavity with a scale, and calculating the volume.

During manufacture of the apparatus, an adjustment may be made to compensate exactly for the dead volume. This may be done using liquid known to follow the Lambert-Beer equation (1) very closely, one example being a 0.01 molar solution of potassium ferricyanide, measured at 415 nanometers. With this solution, no change of the absorbance should be observed as the sample is diluted, as described above, and any absorbance change can be ascribed to a mismatch or inequality between the compensating volume of the solid ring (defined between planes 32 and 35, and between cylinders 33 and 34, as described in FIG. 3a) and the dead volume (the volume of liquid remaining in communication with chambers A and C when the stopcock 53 is closed to passage 89 and the plungers 30 and 22 are at their rightward limits of travel). From such a measurement, the adjustment may be made as by sliding window 14 axially in its mount 16 to adjust the compensating volume of the defined ring to the dead volume, after which no absorbance change should be observable. In other words, the window 14 is adjusted in its mount to eliminate any absorbance change.

Note that the location of barrels 13 and 27 in adjacent relation reduces to a minimum the dead volume represented by passage 28 which intercommunicates the chambers A and C. These barrels may be joined in any conventional manner, as by bonding with an insoluble inert cement, such as epoxy cement.

FIGS. 2 and 3 illustrate the use of tension springs 120 removably attached to the caps 96c and 97c as at 121 and 122, to retain them in assembled relation to the barrel 27.

A significant advantage of the overall arrangement resides in the fact that the cell itself does not have to be disturbed in the course of a series of measurements on a single sample at various dilutions. This enables the making of measurements more quickly, minimizing any effect of possible drift of the spectrophotometer itself, in addition to making the manipulations simpler and more convenient. Finally, all of the apparatus shown in FIG. 1 may be placed in a controlled temperature cavity, or air bath, as represented by the interior 200 of container 201, a suitable temperature control being indicated at 202. Alternatively, all of the FIG. 1 apparatus but the cell assembly 10 may be placed within such a controlled temperature cavity. Such temperature control eliminates or minimizes the effects of temperature change on the measurements.

We claim:

1. A concentration difference cell assembly adapted for use with spectrophotometer apparatus producing a light beam, the cell assembly comprising a. structure defining first and second chambers including windows located to pass the beam transmitted successively through the chambers,
b. said chambers having associated beam path dimensions, the beam path dimension of the first chamber being adapted to increase while the beam path dimension of the second chamber decreases and in response to movement of at least one window, whereby the volume of the first chamber remains proportional to the increase in the beam path dimension of the first chamber, and the sum of the beam path dimensions of the first and second chambers remains constant,
c. the chambers arranged in such relation that a predetermined quantity of a first liquid may be introduced into the first chamber for mixing with auxiliary liquid therein accompanied by movement of said one window toward the second chamber containing second liquid,
d. structure defining a mixing chamber communicating with the beam passing first chamber to receive liquid therefrom and to return said liquid thereto, and
e. there being a passage which retains a remanent portion of said liquid outside the first chamber when the mixing chamber has minimum volume, and the volume of the first chamber outside the beam path is diminished endwise of the first chamber by an amount equal to the volume of said remanent portion to compensate therefor.

2. The cell assembly of claim 1 wherein said structure includes a cap carrying a beam entrance window at the beam entrance end of the first chamber, said cap projecting toward the interior of the chamber relative to said beam entrance window and to an extent defining said first chamber volume diminishing amount.

3. The cell assembly of claim 2 wherein said passage is formed through adjacent walls of barrels containing said chambers.

4. The cell assembly of claim 1 including a plunger movable in the mixing chamber toward and away from a first position corresponding to mixing chamber minimum volume.

5. The cell assembly of claim 3 including a plunger movable in the mixing chamber toward and away from a first position corresponding to mixing chamber minimum volume, said plunger in said first position being proximate one end of said passage.

6. The cell of claim 5 wherein the opposite end of said passage opens into the first chamber via said cap.

7. The cell of claim 6 wherein the cap defines a bore across which said beam entrance window extends in offset relation to an annular cap surface facing the interior of the first chamber.

8. The cell of claim 7 wherein the cap consists of plastic material.

9. The cell of claim 4 including hydraulic means to effect plunger movement toward said first position.

10. The cell of claim 9 wherein said hydraulic means includes a first mixing syringe in communication with a barrel within which the plunger is movable and at the side of the plunger opposite the mixing chamber.

11. A concentration difference cell assembly adapted for use with spectrophotometer apparatus producing a light beam, the assembly comprising a. first and second barrels and first and second plungers movable endwise in the respective barrels, each plunger entirely confined within its respective barrel, b. first and second light passing windows proximate opposite ends of the first barrel, and a third light passing window carried by the movable first plunger in the first barrel in optical alignment with the first and second windows, c. a first chamber in the first barrel between the first and third windows being in communication with a mixing chamber at one side of the second plunger in the second barrel, d. means for introducing sample liquid into the mixing chamber for introduction into the first chamber in the first barrel and for mixing with solvent liquid upon transfer between the first and mixing chambers, and e. hydraulic means in communication with the second barrel at the side of the second plunger opposite the mixing chamber, for hydraulically urging the second plunger in a direction to reduce the volume of the mixing chamber.

12. The cell of claim 11 including said spectrophotometer apparatus producing said beam directed through said cell windows.

13. The cell of claim 11 including other hydraulic means in communication with the first barrel at the side of the first plunger and third window opposite the first chamber, for hydraulically urging the first plunger and third window in a direction to reduce the volume of the first chamber.

14. In the method of producing a concentration difference cell assembly adapted for use with spectrophotometer apparatus producing a light beam to measure absorbance of a mixture of first and auxiliary liquids, the steps that include:

a. providing structure defining first and second chambers including window mounts and windows located to pass the beam transmitted successively through the chambers, b. said chambers having associated beam path dimensions, the beam path dimension of the first chamber being adapted to increase while the beam path dimension of the second chamber decreases and in response to movement of at least one window, whereby the volume of the first chamber remains proportional to the increase in the beam path dimension of the first chamber, and the sum of the beam path dimensions of the first and second chambers remains constant, c. the chambers arranged in such relation that a predetermined quantity of a first liquid in the first chamber may be introduced into the first chamber for mixing with auxiliary liquid therein accompanied by movement of said one window toward the second chamber containing second liquid, d. and adjusting the relative positions of a window and its mount projecting within and at one end of the first chamber to reduce absorbance measurement errors due to dead volume effects.

15. The cell of claim 10 including other hydraulic means having a second mixing syringe and operable to vary said relative beam path dimension, and a third syringe operable to introduce diluting fluid into said mixing chamber.

16. The cell of claim 15 in which said first, second and third syringes are located external to the compartment within which the cell is placed during measurement operation of the spectrophotometer apparatus.

17. The cell of claim 16 including means for maintaining said syringes at controlled temperature.

18. The cell of claim 16 including means for maintaining said cell chambers and syringes at controlled temperature.

* * * * *